Jan. 29, 1952  HSU HSI-YU  2,584,078
AUTO BRAKE
Filed Jan. 28, 1947  3 Sheets-Sheet 1

INVENTOR.
Hsu Hsi-Yu,

BY Victor J. Evans & Co.

ATTORNEYS

Jan. 29, 1952
HSU HSI-YU
2,584,078
AUTO BRAKE
Filed Jan. 28, 1947
3 Sheets-Sheet 2
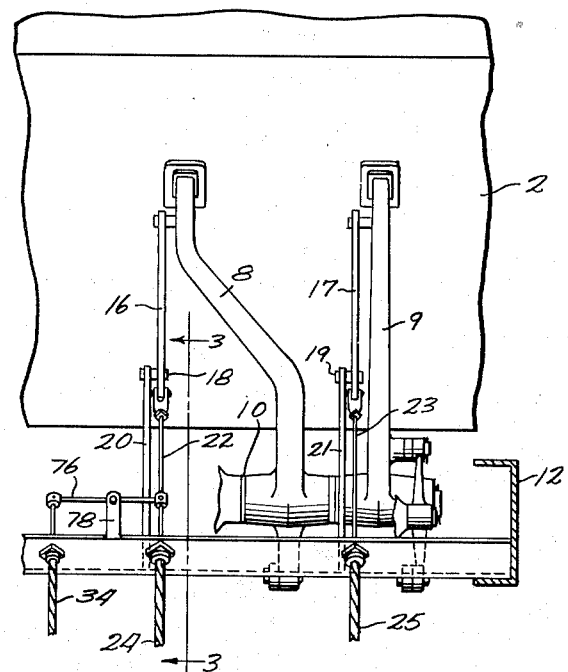
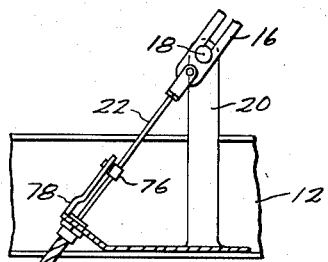
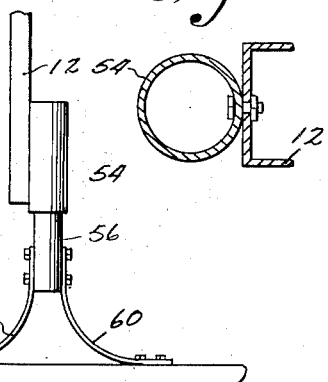
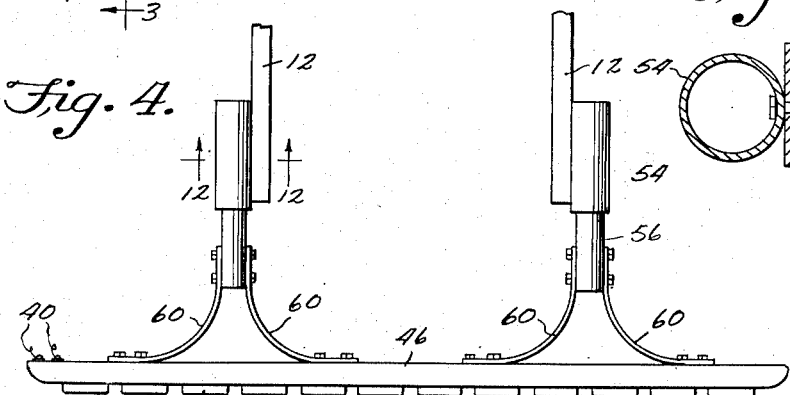
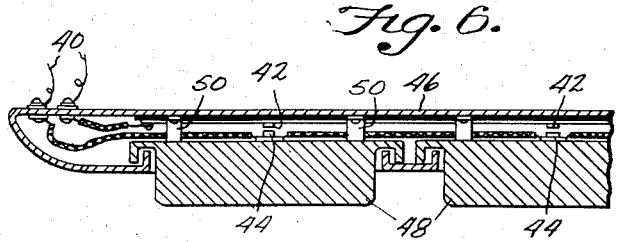
INVENTOR.
Hsu Hsi-Yu,
BY Victor J. Evans & Co.
ATTORNEYS Jan. 29, 1952   HSU HSI-YU   2,584,078
AUTO BRAKE
Filed Jan. 28, 1947   3 Sheets-Sheet 3
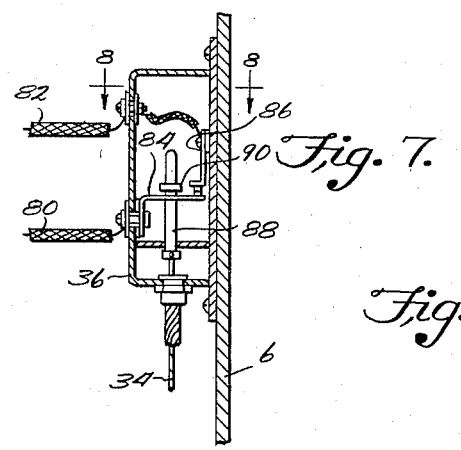
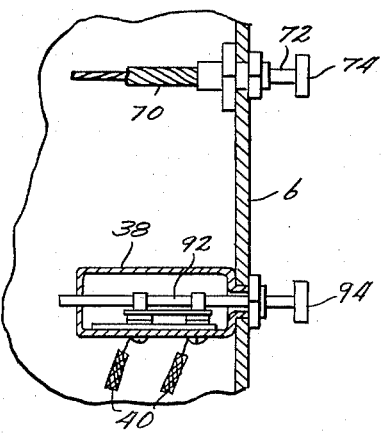
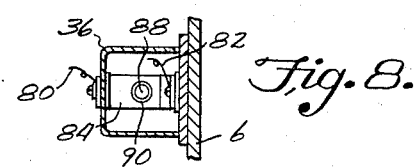
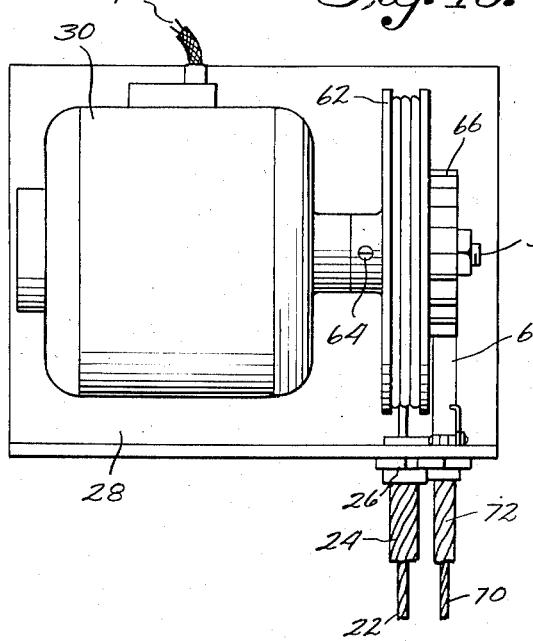
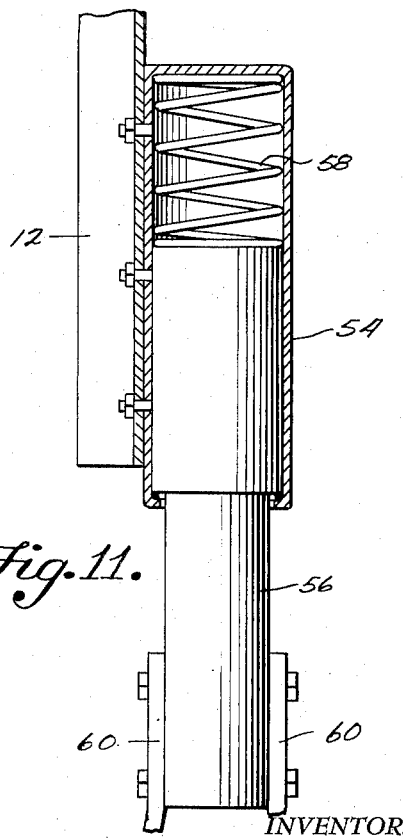
INVENTOR.
Hsu Hsi-Yu,
BY Victor J. Evans & Co.
ATTORNEYS Patented Jan. 29, 1952

2,584,078

UNITED STATES PATENT OFFICE 2,584,078

AUTO BRAKE

Hsu Hsi-Yu, Shanghai, China

Application January 28, 1947, Serial No. 724,767

3 Claims. (Cl. 180—83)

My present invention relates to an improved automatic brake for automobiles and similar vehicles including automatic control means for absorbing the shock of impact while simultaneously applying the brakes, de-clutching the vehicle and breaking the ignition circuit upon contact of the vehicle with a solid object. Generally my invention comprises the use of actuating means mounted as upon the front bumper of the vehicle so that contact of the bumper with, for instance another vehicle will apply the brakes and de-clutch, and also break the ignition circuit to prevent fire, all while absorbing the shock of impact. By the use of the structure of my invention safe operation of the vehicle will be enhanced and where unavoidable collisions do occur the ready application of the brakes and de-clutching together with the cutting of the ignition will lessen the likelihood of damage subsequent and in addition to the actual collision.

In the drawings:

Figure 2 is a plan view of the brake and clutch actuators.

Figure 3 is a side view of one actuator.

Figure 4 is a top plan view of the bumper employing the built in switches.

Figure 5 is a front elevational view thereof.

Figure 6 is a sectional detail view of a button switch.

Figure 1:
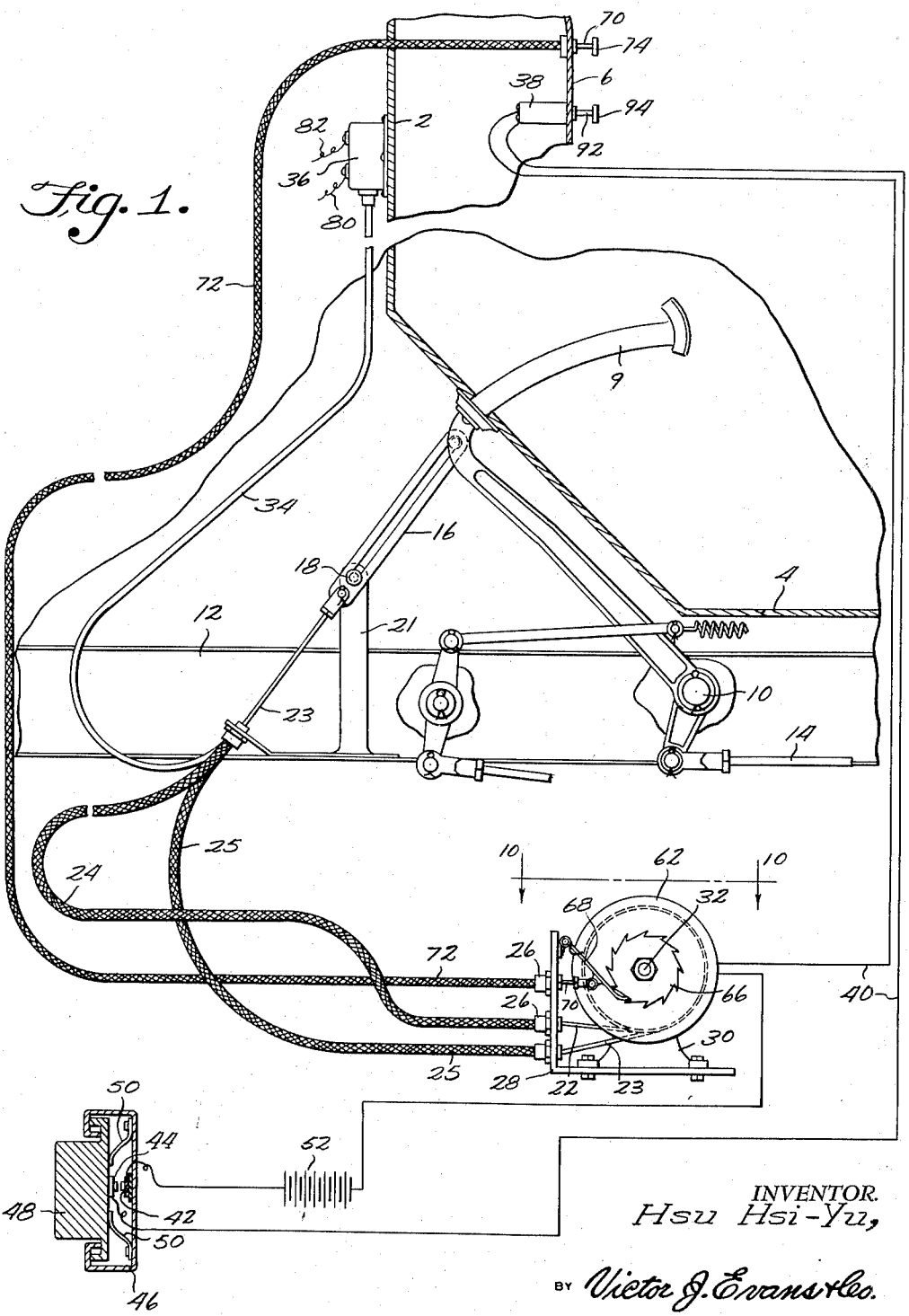
Figure 1 is a diagrammatic view of the structure of my invention.

Figures 7, 8, and 9 are detail views of the ignition circuit breaking switch and the main control switch.

Figure 10 is a plan view of the motor.

Figure 11 is a sectional view of the bumper mount including details of the spring cylinder.

Figure 12 is a sectional view at line 12—12 of Figure 4.

In carrying out my invention I utilize the dashboard 2 and floor board 4 of the conventional motor vehicles having an instrument panel 6 and brake pedal 8 and clutch pedal 9 on the usual shaft 10, pivotally mounted in the vehicle frame 12.

Brake rod 14 is connected as usual to the master brake cylinder and the clutch pedal actuates the clutch in normal fashion. To the pedals 8 and 9, I attach slotted links designated 16 and 17 respectively, having pin guides 18 and 19, mounted in standards 20 and 21. Flexible cables 22 and 23 in casings 24 and 25 are attached through clevises to the slotted arms, and these cables are secured slidably by collars 26 and 27 in the mount 28 for the motor 30. The motor is formed with a shaft 32.

A cable 34 extends from the brake pedal actuating means to an ignition cut off switch 36, and a switch 38 is provided in the motor circuit 40 to permit selective control of the automatic structure.

Contacts 42 and 44 are located within the bumper 46, and buttons 48 are carried by the bumper. The contacts 42 are carried by the bumper, and the contacts 44 are carried by the buttons. The contacts 44 are normally held out of engagement with the contacts 42 by springs 50, so that the circuit to the motor is closed only upon depression of a button. A battery 52 may be employed to provide the electrical current for the motor.

The bumper of the type herein employed is secured upon the frame 12 through the cylinders 54 housing pistons 56, and spaced by springs 58, the arcuate supports 60 providing supporting means between the pistons and the bumper. As a button, one of the series on the bumper, is depressed by contact with any solid object, the motor circuit is closed and the motor actuated, provided of course the main switch 38 is closed.

On the motor shaft I mount a pulley 62 secured by screw 64 for the cables 22 and 23, so that rotation of the motor will wind the cables on the pulley. A ratchet wheel 66 is rotated with the shaft and a spring dog 68 engages the ratchet wheel to secure it in rotated position to maintain the brake and clutch cables in actuated position until released through cable 70 in housing 72 and having a knob 74 mounted in the instrument panel.

The cable 34 to switch 36 is actuated through link 76 mounted on post 78 and the wires 80 and 82 of the ignition circuit are connected to contacts 84 and 86 normally closed but subject to opening by the rod 88 on the end of cable 34 and having a collar 90 engaging the contact 84 to separate the contacts as the brake pedal is depressed by the motor actuation. The master switch consists in a rod 92 having a knob 94 arranged to close the circuit through the wires 40 when it is desired to use the automatic structure.

Thus upon contact of the button studded bumper, the motor circuit will be closed, depressing the brake and clutch pedals and the ignition circuit will be broken. The device will remain in actuated condition by the ratchet until released by knob 74.

From the above description it will be apparent that the structure of my invention will, without attention from the driver, automatically react to contact with an obstruction to perform the fundamental operations incident to collision which fundamentals are often not carried out due to the mental reaction of the driver.

With the brakes applied and the clutch disengaged, and with the ignition circuit opened, danger of further damage and fire is eliminated and the damage of the accident is kept at a minimum by the shock-absorbing feature supplied by the coil springs 58.

Having thus fully described my invention, what I claim as new and desire to secure by Letters Patent is:

1. In a motor vehicle bumper contact actuated stop device, the combination which comprises a bumper positioned on the forward end of a vehicle, spaced arms extended rearwardly from the bumper, cylinders in which the said arms are slidably mounted, shock absorbing springs positioned in the cylinders, a switch positioned on the bumper, a pad slidably mounted on the bumper and positioned to close the said switch as the bumper and pad are engaged by an object, a clutch lever pivotally mounted in the vehicle, a brake lever pivotally mounted in the vehicle, a support having a pin extended therefrom mounted on the vehicle and spaced from the said clutch and brake levers, slotted links positioned to slide over the pin of the support and connected to said clutch and brake levers respectively, a drum positioned in the vehicle, flexible cables mounted on the drum and connected to said slotted links, a motor for actuating the said drum, and a circuit connecting the said motor and switch on the bumper to a source of current supply.

2. In a motor vehicle bumper contact actuated stop device, the combination which comprises a bumper positioned on the forward end of a vehicle, spaced arms extended rearwardly from the bumper, cylinders in which the said arms are slidably mounted, shock absorbing springs positioned in the cylinders, a switch positioned on the bumper, a pad slidably mounted on the bumper and positioned to close the said switch as the bumper and pad are engaged by an object, a clutch lever pivotally mounted in the vehicle, a brake lever pivotally mounted in the vehicle, a support having a pin extended therefrom mounted on the vehicle and spaced from the said clutch and brake levers, slotted links positioned to slide over the pin of the support and connected to said clutch and brake levers respectively, a drum positioned in the vehicle, flexible cables mounted on the drum and connected to said slotted links, a motor for actuating the said drum, a circuit connecting the said motor and switch on the bumper to a source of current supply, a ratchet on said drum for preventing rotation of the drum to release the said flexible cable, and means actuating the said ratchet from a remote point.

3. In a motor vehicle bumper contact actuated stop device, the combination which comprises a bumper positioned on the forward end of a vehicle, spaced arms extended rearwardly from the bumper, cylinders in which the said arms are slidably mounted, shock absorbing springs positioned in the cylinders, a switch positioned on the bumper, a pad slidably mounted on the bumper and positioned to close the said switch as the bumper and pad are engaged by an object, a clutch lever pivotally mounted in the vehicle, a brake lever pivotally mounted in the vehicle, a support having a pin extended therefrom mounted on the vehicle and spaced from the said clutch and brake levers, slotted links positioned to slide over the pin of the support and connected to said clutch and brake levers respectively, a drum positioned in the vehicle, flexible cables mounted on the drum and connected to said slotted links, an ignition switch, means connecting the ignition switch to the connection of the flexible cables to the said clutch and brake levers for breaking the circuit of the vehicle, a motor for actuating the said drum, a circuit connecting the said motor and switch on the bumper to source of current supply, a ratchet on said drum for preventing rotation of the drum to release the said flexible cable, and means actuating the said ratchet from a remote point.

HSU HSI-YU.

REFERENCES CITED

The following references are of record in the file of this patent:

UNITED STATES PATENTS

| Number | Name | Date |
|---|---|---|
| 1,412,212 | Miyagi | Apr. 11, 1922 |
| 1,721,605 | Schauman et al. | July 23, 1929 |
| 1,804,032 | Rottman | May 5, 1931 |
| 1,811,484 | Westlund | June 23, 1931 |
| 1,878,194 | Silbermann | Sept. 20, 1932 |
| 2,192,021 | Weeks | Feb. 27, 1940 |
| 2,232,726 | Perez | Feb. 25, 1941 |

FOREIGN PATENTS

| Number | Country | Date |
|---|---|---|
| 215,314 | Great Britain | Oct. 2, 1924 |
| 296,977 | Great Britain | Mar. 14, 1929 |